（12）United States Patent
Albertus et al.

(10) Patent No.: US 9,172,123 B2
(45) Date of Patent: Oct. 27, 2015

(54) METAL/AIR BATTERY WITH GAS DRIVEN MIXING

(71) Applicant: Robert Bosch GmbH, Stuttgart (DE)

(72) Inventors: Paul S. Albertus, Mountain View, CA (US); John F. Christensen, Mountain View, CA (US); Timm Lohmann, Mountain View, CA (US); Boris Kozinsky, Waban, MA (US); Roel S. Sanchez-Carrera, Sommerville, MA (US)

(73) Assignee: Robert Bosch GmbH, Stuttgart (DE)

( * ) Notice: Subject to any disclaimer, the term of this patent is extended or adjusted under 35 U.S.C. 154(b) by 156 days.

(21) Appl. No.: 13/926,635

(22) Filed: Jun. 25, 2013

(65) Prior Publication Data
US 2013/0344403 A1  Dec. 26, 2013

Related U.S. Application Data

(60) Provisional application No. 61/664,116, filed on Jun. 25, 2012.

(51) Int. Cl.
| | |
|---|---|
| *H01M 8/22* | (2006.01) |
| *H01M 12/08* | (2006.01) |
| *H01M 10/052* | (2010.01) |
| *H01M 8/04* | (2006.01) |

(52) U.S. Cl.
CPC .......... *H01M 12/08* (2013.01); *H01M 8/04089* (2013.01); *H01M 8/04201* (2013.01); *H01M 8/04276* (2013.01); *H01M 10/052* (2013.01); *H01M 2220/20* (2013.01); *H01M 2250/20* (2013.01); *Y02E 60/50* (2013.01)

(58) Field of Classification Search
CPC ................... H01M 12/08; H01M 2004/8689; H01M 4/88; Y02E 60/50
USPC ............ 429/148, 231.95, 402, 403, 404, 407, 429/514
See application file for complete search history.

(56) References Cited

U.S. PATENT DOCUMENTS

| 3,391,027 A | 7/1968 | Porter, II |
| 2011/0059355 A1 | 3/2011 | Zhang et al. |

FOREIGN PATENT DOCUMENTS

| JP | 04154054 A | * 5/1992 | ............ H01M 12/06 |
| JP | H04-154054 A | 5/1992 | |
| WO | 2011/011082 A1 | 1/2011 | |

OTHER PUBLICATIONS

Abraham et al., "A Polymer Electrolyte-Based Rechargeable Lithium/Oxygen Battery", Journal of the Electrochemical Society; 1996; pp. 1-5; vol. 143, No. 1; Norwood, USA (5 pages).

(Continued)

*Primary Examiner* — Patrick Ryan
*Assistant Examiner* — Ben Lewis
(74) *Attorney, Agent, or Firm* — Maginot Moore & Beck LLP

(57) ABSTRACT

In one embodiment, a metal/air battery includes a negative electrode, a positive electrode, a protection layer located between the negative electrode and the positive electrode, and a liquid phase electrolyte within the positive electrode, wherein the positive electrode is arranged to induce convection of the electrolyte by movement of a gas phase of oxygen within the positive electrode.

7 Claims, 5 Drawing Sheets

(56) References Cited

OTHER PUBLICATIONS

Amatucci et al., "Flouride based electrode materials for advanced energy storage devices", Journal of Flourine Chemistry; 2007; pp. 243-262; vol. 128, No. 4; Elsevier Publishing; North Brunswick, USA (20 pages).

Beattie et al., "High-capacity lithium-air cathodes", Journal of the Electrochemical Society; 2009; vol. 156; Canada (13 pages).

Cabana et al, "Beyond Intercalation-Based Li-Ion Batteries: The State of the Art and Challenges of Electrode Materials Reacting Through Conversion Reactions", Advanced Materials; 2010; pp. E170-E192; vol. 22, Issue 35; Wiley -Vch Verlag GmbH; Europe.

Kumar et al., "A Solid-State, Rechargeable, Long Cycle Life Lithium-Air Battery", Journal of the Electrochemical Society; 2010; pp. A50-A54; vol. 157, Issue 1; USA (5 pages).

Ogasawara et al., "Rechargeable $Li_2O_2$ Electrode for Lithium Batteries", Journal of the American Chemical Society; 2006; pp. 1390-1393; vol. 128, No. 4; Europe (4 pages).

Read, "Characterization of the Lithium/Oxygen Organic Electrolyte Battery", Journal of the Electrochemical Society; 2002; pp. A1190-A1195; vol. 149; Adelphi, USA (6 pages).

Read et al., "Oxygen Transport Properties of Organic Electrolytes and Performance of Lithium/Oxygen Battery", Journal of the Electrochemical Society; 2003; pp. A1351-A1356; vol. 150; Adelphi, USA (6 pages).

Stevens et al., "Development of a Lithium Air Rechargeable Battery", ECS Transactions; 2010; pp. 1-12; vol. 28, No. 32; France (12 pages).

USABC, "USABC Goals for Advanced Batteries for EVs", United States Advanced Battery Consortium; 2002 (1 page).

Yang et al., "The effect of oxygen pressures on the electrochemical profile of lithium/oxygen battery", Journal of Solid State Electrochemistry; 2010; pp. 109-114; vol. 14; Shanghai, China (6 pages).

Zheng et al., "Theoretical Energy Density of Li-Air Batteries", Journal of the Electrochemical Society; 2008; pp. A432-A437; vol. 155, No. 6; USA (6 pages).

Partial International Search Report corresponding to PCT Application No. PCT/US2013/047648, mailed Oct. 24, 2013 (6 pages).

Christensen, Jake, et al., "A Critical Review of Li/Air Batteries," Journal of the Electrochemical Society, 159 (2) R1-R30 (2012) (30 pages).

* cited by examiner

METAL/AIR BATTERY WITH GAS DRIVEN MIXING

This application claims the benefit of U.S. Provisional Application No. 61/664,116, filed on Jun. 25, 2012, the entire contents of which are herein incorporated by reference.

TECHNICAL FIELD

This disclosure relates to metal/air batteries and more particularly to lithium/air based batteries.

BACKGROUND

Rechargeable lithium-ion batteries are attractive energy storage systems for portable electronics and electric and hybrid-electric vehicles because of their high specific energy compared to other electrochemical energy storage devices. A typical Li-ion cell contains a negative electrode, a positive electrode, and a separator region between the negative and positive electrodes. Both electrodes contain active materials that insert or react with lithium reversibly. In some cases the negative electrode may include lithium metal, which can be electrochemically dissolved and deposited reversibly. The separator contains an electrolyte with a lithium cation, and serves as a physical barrier between the electrodes such that none of the electrodes are electronically connected within the cell.

Typically, during charging, there is generation of electrons at the positive electrode and consumption of an equal amount of electrons at the negative electrode, and these electrons are transferred via an external circuit. In the ideal charging of the cell, these electrons are generated at the positive electrode because there is extraction via oxidation of lithium ions from the active material of the positive electrode, and the electrons are consumed at the negative electrode because there is reduction of lithium ions into the active material of the negative electrode. During discharging, the exact opposite reactions occur.

In particular, batteries with a lithium metal negative electrode afford exceptionally high specific energy (in Wh/kg) and energy density (in Wh/L) compared to batteries with conventional carbonaceous negative electrodes. Other metals, such as Zn, Al, Mg, Si, and others, also have a favorable specific energy and energy density. However, the cycle life of such systems is rather limited due to (a) formation of dendrites during recharge that may penetrate the separator and short the cell and/or result in fragmentation and capacity loss of the negative electrode; (b) morphology changes in the metal upon extended cycling that result in a large overall volume change in the cell; and (c) changes in the structure and composition of the passivating layer that forms at the surface of the metal when exposed to certain electrolytes, which may isolate some metal and/or increase the resistance of the cell over time.

When high-specific-capacity negative electrodes such as a metal are used in a battery, the maximum benefit of the capacity increase over conventional systems is realized when a high-capacity positive electrode active material is also used. For example, conventional lithium-intercalating oxides (e.g., $LiCoO_2$, $LiNi_{0.8}Co_{0.15}Al_{0.05}O_2$, $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g, which is quite low compared to the specific capacity of lithium metal, 3863 mAh/g. The highest theoretical capacity achievable for a lithium-ion positive electrode is 1794 mAh/g (based on the mass of the lithiated material) for $Li_2O$. Other high-capacity materials include $BiF_3$ (303 mAh/g, lithiated), $FeF_3$ (712 mAh/g, lithiated), and others. See G. G. Amatucci and N. Pereira, "Fluoride based electrode materials for advanced energy storage devices." *Journal of Fluorine Chemistry*, 2007. 128(4): p. 243-262 and J. Cabana, L. Monconduit, D. Larcher and M. R. Palacin, "Beyond Intercalation-Based Li-Ion Batteries: The State of the Art and Challenges of Electrode Materials Reacting Through Conversion Reactions." *Advanced Materials*, 2010. 22(35): p. E170-E192. Unfortunately, all of these materials react with lithium at a lower voltage compared to conventional oxide positive electrodes, hence limiting the theoretical specific energy; however, the theoretical specific energies are still very high (>800 Wh/kg, compared to a maximum of ~500 Wh/kg for a cell with lithium negative and conventional oxide positive electrodes).

To enable electric vehicles with a range approaching that of present-day vehicles (>300 miles) a battery chemistry with a significantly higher specific energy is required than the present state of the art Lithium-ion batteries. FIG. 1 depicts a chart 10 showing the range achievable for a vehicle using battery packs of different specific energies versus the weight of the battery pack. In the chart 10, the specific energies are for an entire cell, including cell packaging weight, assuming a 50% weight increase for forming a battery pack from a particular set of cells. The vertical line 12 gives the maximum acceptable battery pack weight, according to the goals set by the Department of Energy. As indicted by line 12, the U.S. Department of Energy has established a weight limit of 200 kg for a battery pack that is located within a vehicle. Accordingly, only a battery pack with about 600 Wh/kg or more can achieve a range of 300 miles.

Various lithium-based chemistries have been investigated for use in various applications including in vehicles. FIG. 2 depicts a chart 20 which identifies the specific energy and energy density of various lithium-based chemistries. In the chart 20, only the weight of the active materials, current collectors, binders, separator, and other inert material of the battery cells are included. The packaging weight, such as tabs, the cell can, etc., are not included. As is evident from the chart 20, through the use of a lithium metal negative electrode and a positive electrode reacting the oxygen from air, a driving range above 300 miles is possible.

A typical lithium/air electrochemical cell 50 is depicted in FIG. 3. The cell 50 includes a negative electrode 52, a positive electrode 54, and a porous separator 56. The negative electrode 52 is typically metallic lithium. The positive electrode 54 includes electrode particles such as particles 60 possibly coated in a catalyst material (such as Au or Pt) and suspended in a porous, electrically conductive matrix 62. An electrolyte solution 64 containing a salt such as LiPF6 dissolved in an organic solvent such as dimethyl ether or $CH_3CN$ permeates both the porous separator 56 and the positive electrode 54. The $LiPF_6$ provides the electrolyte with an adequate conductivity which reduces the internal electrical resistance of the cell 50 to allow a high power.

A portion of the positive electrode 52 is enclosed by a barrier 66. The barrier 66 in FIG. 3 is configured to allow oxygen from an external source 68 to enter the positive electrode 54. The wetting properties of the positive electrode 54 prevent the electrolyte 64 from leaking out of the positive electrode 54, or another electrolyte-containment method is used. Oxygen from the external source 68 enters the positive electrode 54 through the barrier 66 while the cell 50 discharges and oxygen exits the positive electrode 54 through the barrier 66 as the cell 50 is charged. The barrier 66 may also supply oxygen for all of the cells in a stack, and therefore not be directly adjacent to individual cells.

As an example of the reactions and technological requirements in a metal/air cell, during discharge of the lithium/air cell, Li metal dissolved from the negative electrode 52, while at the positive electrode 54, Li+ ions in the electrolyte react with oxygen and electrons to form a solid $Li_2O_2$ (or $Li_2O$) product, which may coat or fill the conductive matrix of the positive electrode 54 and/or fill the pores of the electrode. The solid product is thought to be electronically insulating, at least in its crystalline, bulk form. During charge of the cell, the $Li_2O_2$ (or $Li_2O$) is oxidized to form $O_2$, $Li^+$ in the electrolyte, and electrons at the positive electrode 54, while at the negative electrode 52, $Li^+$ in the electrolyte is reduced to form Li metal. The reactions that may occur at each electrode are shown by the following (only the reaction forming $Li_2O_2$ is shown here):

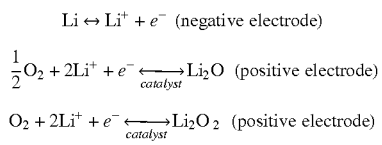

There are significant challenges that must be addressed for the lithium-air system to become commercially viable. Important challenges include reducing the hysteresis between the charge and discharge voltages (which limits the round-trip energy efficiency), improving the number of cycles over which the system can be cycled reversibly, limiting dendrite formation at the lithium metal surface, protecting the lithium metal (and possibly other materials) from moisture and other potentially harmful components of air, and designing a system that actually achieves a high specific energy and has an acceptable specific power. FIG. 4(a) shows a typical discharge and charge curve for a lithium/air system. As can be seen in FIG. 4(a), the discharge voltage 70 (approximately 2.5 to 3 V vs. Li/Li+) is much lower than the charge voltage 72 (approximately 4 to 4.5 V vs. Li/Li+). The equilibrium voltage (or open-circuit potential) of the lithium/air system is approximately 3 V. Hence, the voltage hysteresis is not only large, but also very asymmetric. FIG. 4(b) is a plot of the decay in the discharge capacity for both an uncatalyzed (carbon only) 74 and catalyzed (EMD-carbon) design 76 over a number of cycles. The experimental results shown in FIGS. 4(a) and 4(b) demonstrate two principle problems with the lithium/air system: the large voltage hysteresis between the charge and discharge curves and rapid loss of capacity with cycling.

Abraham and Jiang published one of the earliest papers on the "lithium-air" system. See Abraham, K. M. and Z. Jiang, "A polymer electrolyte-based rechargeable lithium/oxygen battery"; *Journal of the Electrochemical Society*, 1996. 143 (1): p. 1-5. Abraham and Jiang used an organic electrolyte and a positive electrode with an electrically conductive carbon matrix containing a catalyst to aid with the reduction and oxidation reactions. Previous lithium-air systems using an aqueous electrolyte have also been considered, but without protection of the Li metal anode, rapid hydrogen evolution occurs. See Zheng, J., et al., "Theoretical Energy Density of Li—Air Batteries"; *Journal of the Electrochemical Society*, 2008. 155: p. A432.

What is needed is a battery which improves the mass-transport effects within the cell, including the cathode. A battery which exhibits improved mass-transport effects during both charge and discharge would be further beneficial.

SUMMARY

In one embodiment, a metal/air battery includes a negative electrode, a positive electrode, a protection layer located between the negative electrode and the positive electrode, and a liquid phase electrolyte within the positive electrode, wherein the positive electrode is arranged to induce convection of the electrolyte by movement of a gas phase of oxygen within the positive electrode.

In another embodiment, a method of forming a metal/air battery includes determining a limiting current for the metal/air battery, determining an electrolyte convection amount based upon the determined limiting current, providing a negative electrode, providing a positive electrode arranged to induce the determined electrolyte convection by movement of a gas phase of oxygen within the positive electrode, providing a protection layer located between the negative electrode and the positive electrode, and providing a liquid phase electrolyte within the positive electrode.

DETAILED DESCRIPTION

Figure 1:
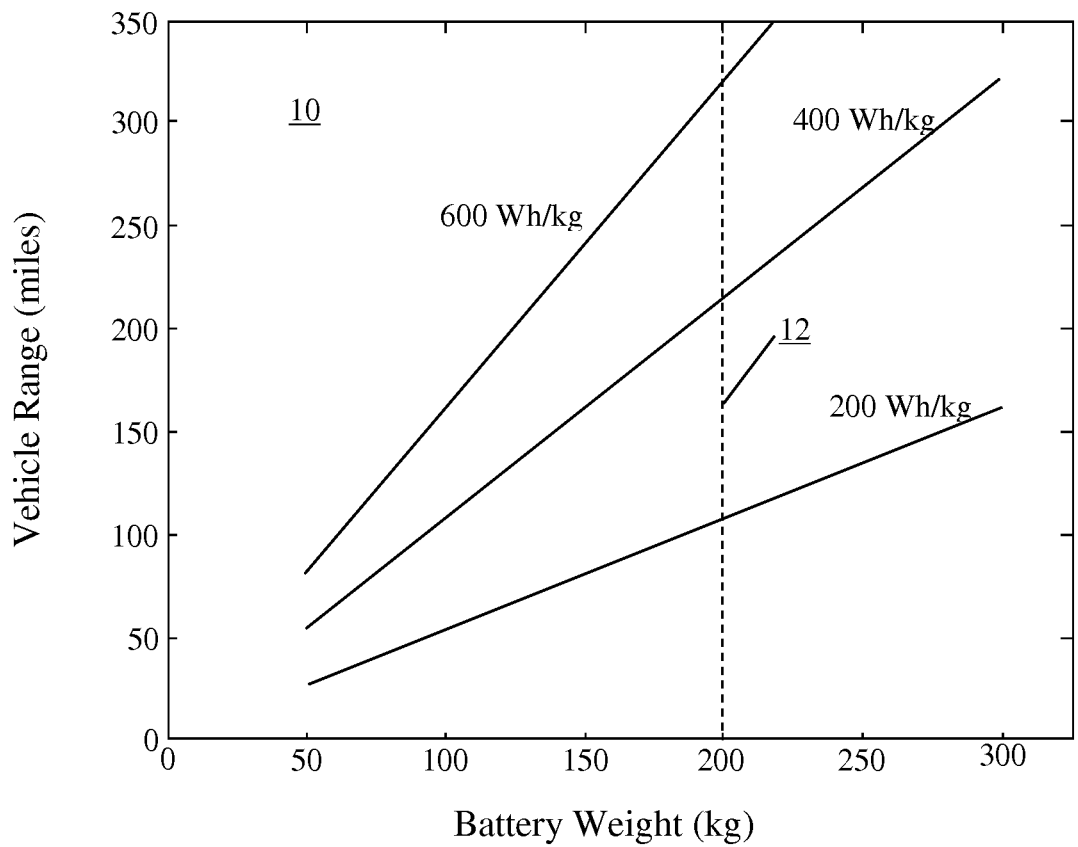
FIG. 1 is a graph showing available driving range and the battery weight for battery packs with different specific energies.
Figure 2:
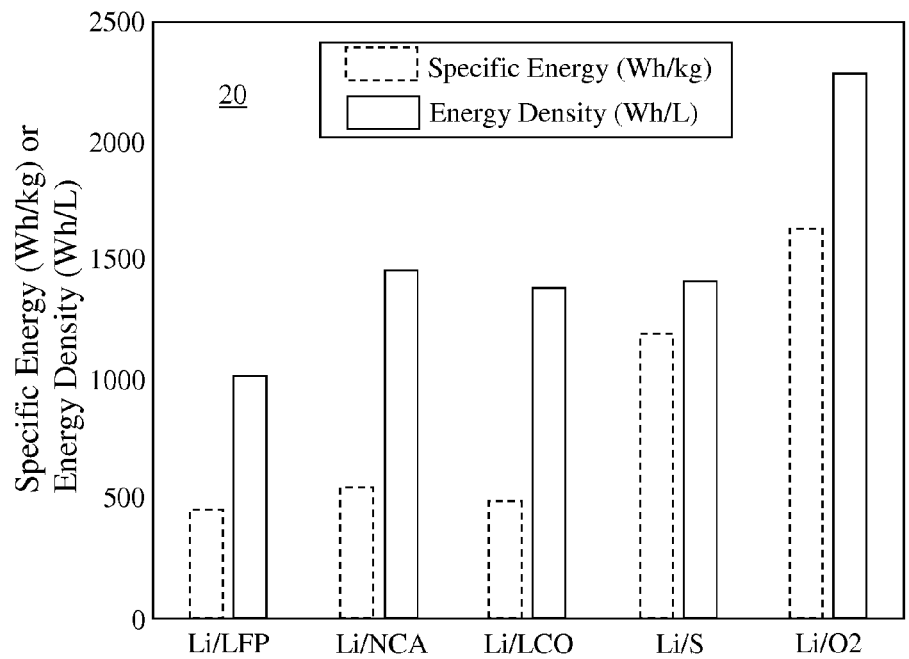
FIG. 2 is a graph showing specific energy and energy density of several cell chemistries using a lithium metal negative electrode.
Figure 3:
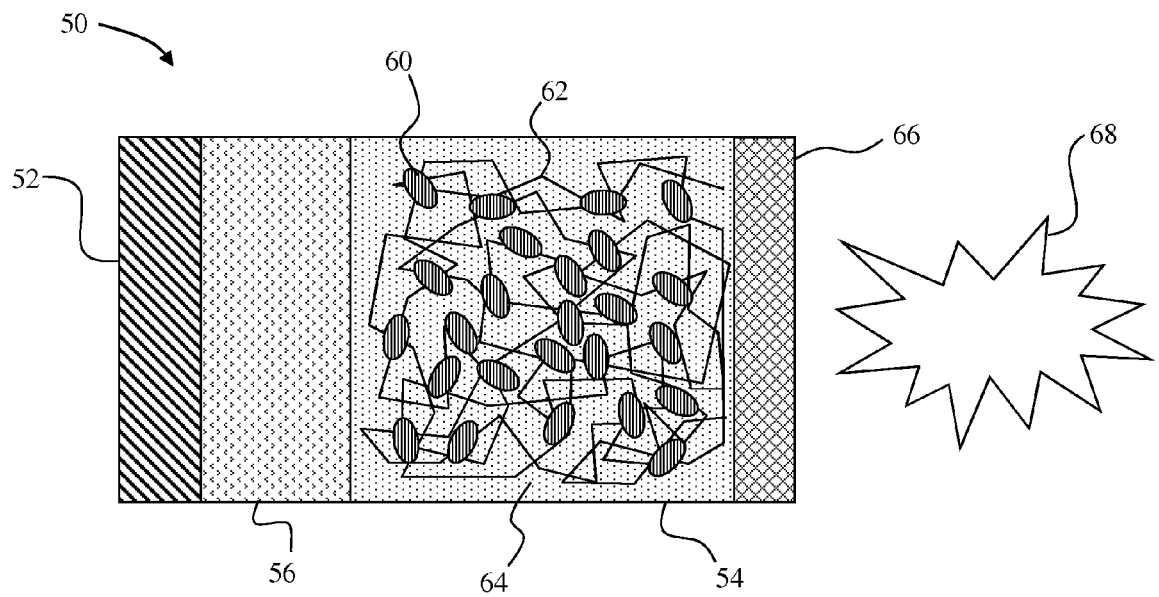
FIG. 3 is a schematic of a common lithium/air cell design.
Figure 4A:
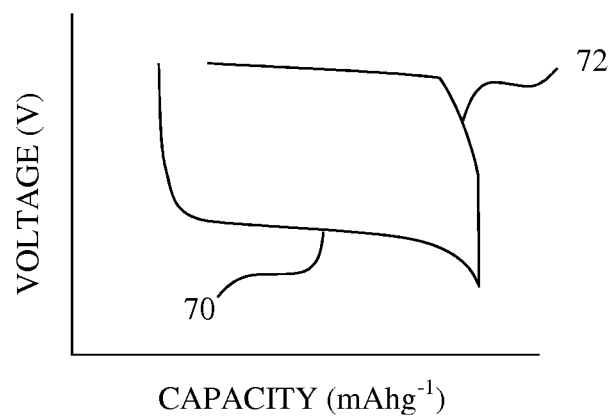
FIG. 4(a) is a graph of a typical discharge and charge curve for a lithium/air system.
Figure 4B:
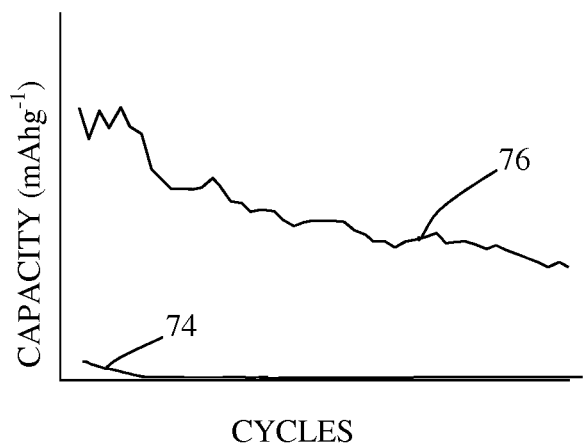
FIG. 4(b) is a graph of the decay in the discharge capacity for both an uncatalyzed (carbon only) and catalyzed (EMD-carbon) design.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Metal/air batteries such as Lithium-based batteries have a sufficiently high specific energy (Wh/kg) and specific power (Wh/L) that they are now being used in electric-powered vehicles. However, in order to power a full-electric vehicle with a range of several hundred miles, a battery with a higher specific energy than the present state of the art (an intercalation system with a graphite anode and transition-metal oxide cathode) is necessary. The lithium-air battery, which uses a lithium metal negative electrode and a positive electrode that reduces air to form lithium peroxide or lithium oxide, has a significantly higher specific energy than the present state of the art. Other Metal/air batteries, such as Zn, Al, Si, Mg, and others, also have a very high specific energy.

Reactions among Li and oxygen to give high-energy products may be carried out in a number of chemical media and with additional reactants. As two specific examples, in a nonaqueous medium the products $Li_2O_2$ and $Li_2O$ may form, while in a basic aqueous medium LiOH (dissolved) and eventually $LiOH.H_2O$ (precipitated) may form. While a number of physical processes cause voltage drops within an electrochemical cell, and thereby lower energy efficiency and power output, mass-transfer limitations are an important limitation at high current densities. The transport properties of aqueous electrolytes are typically better than nonaqueous electrolytes, but in each case mass-transport effects can limit the thickness of the various regions within the cell, including the cathode. Reactions among $O_2$ and other metals may also be carried out in various media.

One benefit of the present disclosure is to increase the limiting current in a Metal/air cell by using the incoming gas (which includes oxygen and perhaps other components) to create mixing in the liquid electrolyte. Mixing of a liquid electrolyte will increase the limiting current, and can do so by well more than a factor of 10. The advantage of increasing the limiting current is that the cell can be operated at a higher current density, thereby reducing the total superficial area required to meet a given power requirement. Alternatively, an increase in the limiting current can allow a thicker electrode to be used while maintaining the same current density, which can increase the mass of active material stored in the electrode relative to the mass of inert components such as lithium protection layers, whose value is often fixed to a minimum value.

An important feature of the current disclosure is to make use of the higher flow rates of input gas (including oxygen) required during the application of higher current densities to cause a corresponding rise in the limiting current. In other words, the increase in the limiting current depends on the gas flow rate, and the higher gas flow rates correspond to current densities in which an increase in the limiting current is most important. Thus, the present disclosure makes use of the variable flow rate of the incoming gas stream to create a variable increase in the limiting current, with the highest increase in the limiting current occurring at the highest gas flow rates.

Figure 5:
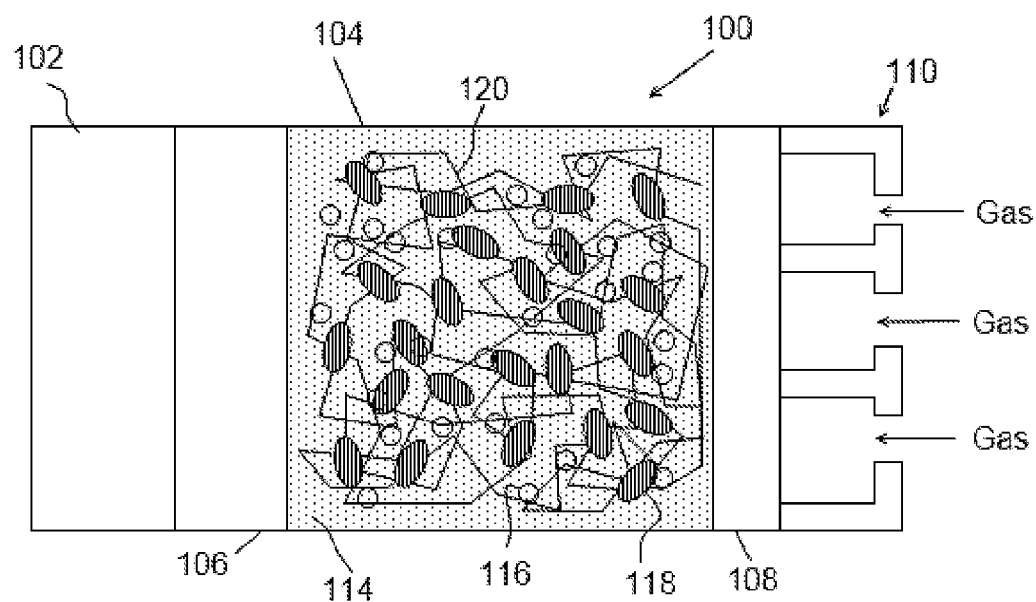
FIG. 5 is a schematic of a Li/air cell in which no electrolyte convection is induced, and there is no increase in the limiting current.

While the following examples are provided for the Li/air cell, which is of highest interest in the present disclosure, the disclosure also applies to other Metal/air battery couples. In fact, it applies to any battery couple in which an input gas stream is used as a reactant and supplied to the cell during discharge. FIG. 5 shows an embodiment of a Metal/air electrochemical cell 100 in which the gas is delivered to the electrode in the in-plane direction and no electrolyte mixing occurs, in which case the limiting current is not increased by the gas flowing to the electrode. The cell 100 includes a negative electrode 102 (metal anode) and a positive electrode 104 (a multi-phase cathode) separated by a protection layer 106. In this embodiment of FIG. 5, the cathode 104 contains liquid electrolyte 114, gas phase 116, and solid phase 118 (metal oxide discharge product) as well as a conductive substrate material 120, such as carbon fibers. The reactions are carried out at the three-phase boundaries. An electrolyte-containment layer 108 is included in FIG. 5 and subsequent figures. The role of this layer is to prevent electrolyte from leaving the cell during either discharge or charge. Its importance is expected to be especially high when significant entrainment of electrolyte in gas flow is possible, when a volatile solvent is used, or when resupplying the solvent is difficult or impossible. Such a layer may be practically achieved using a thin, porous medium with a wettability that prevents electrolyte passage. In FIG. 5, flow channels 110 guide gas toward the containment layer 108.

Figure 6:
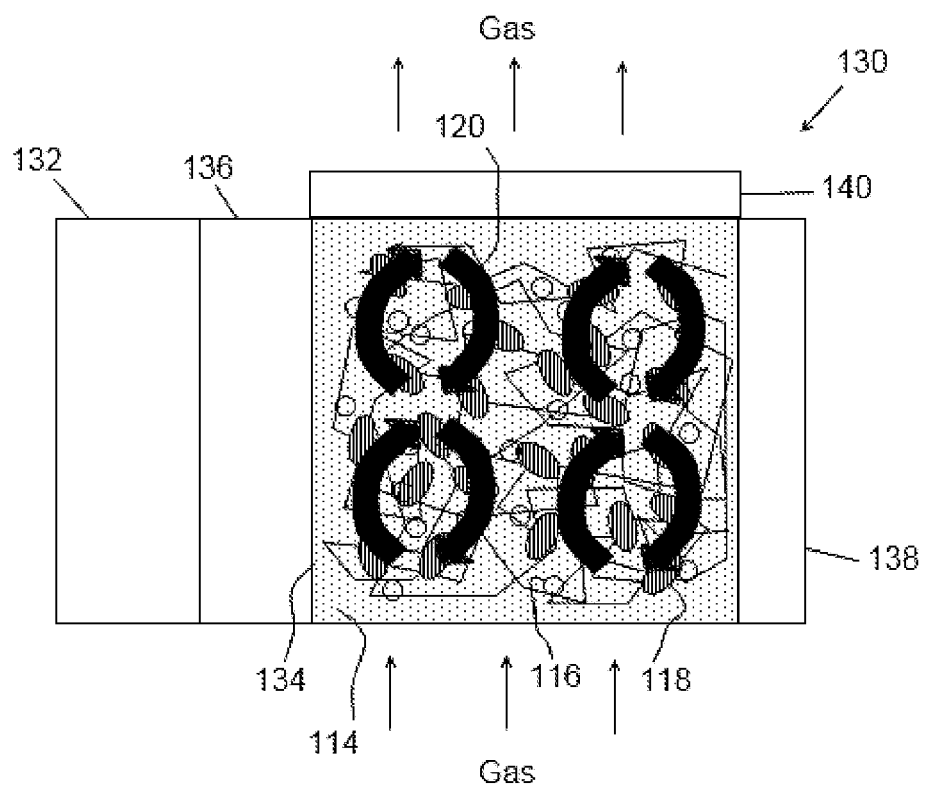
FIG. 6 is a schematic of a Li/air cell making use of a flow-through electrode that induces convection within the electrode through the motion of the gas passing through it.
Figure 7:
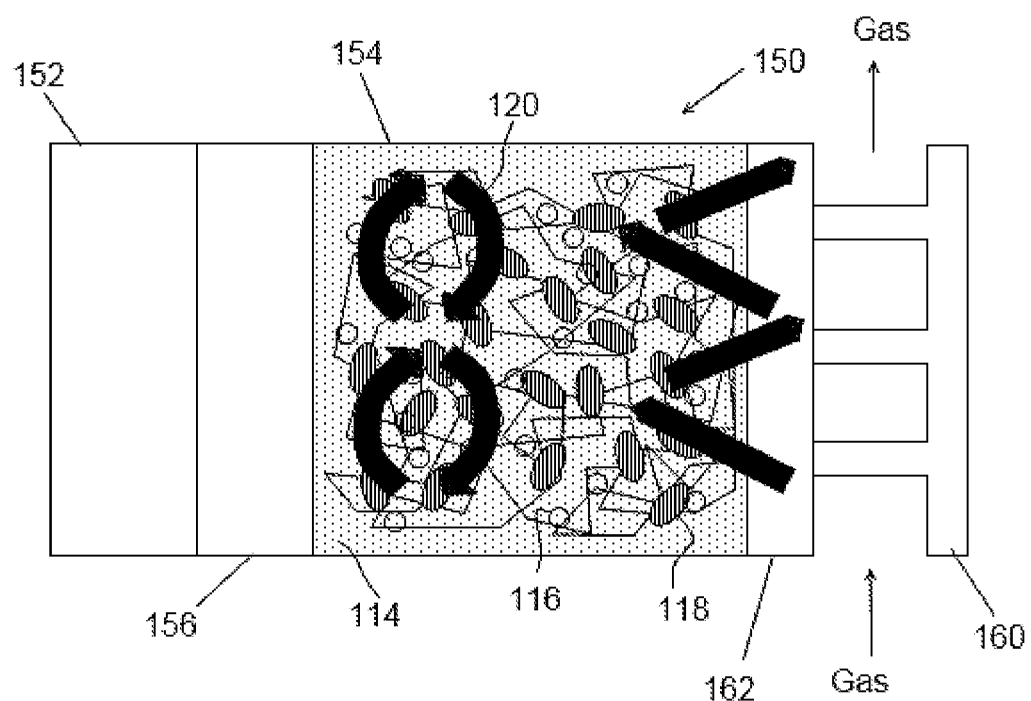
FIG. 7 is a schematic of a Li/air cell making use of a flow-through electrode that induces convection within the electrode through the motion of the gas passing around the baffling and through the electrolyte.

FIG. 6 and FIG. 7 show two alternative embodiments in which the gas flowing to the electrode leads to electrolyte convection and an increase in the limiting current achieved in the metal/air cell. In FIG. 6, the electrochemical cell 130 includes a negative electrode 132 (metal anode) and a positive electrode 134 (multi-phase cathode) separated by a protection layer 136. Similar to FIG. 5, the cathode contains liquid electrolyte 114, gas phase 116, and solid phase 118 (discharge product) as well as a conductive substrate material 120. The cell 130 has a flow-through electrode design in which the gas is fed from one side of the electrode. The gas flowing through the electrode introduces convection to the electrolyte, thereby increasing the limiting current. In the embodiment of FIG. 6, the containment layer 140 is provided along a side of the electrode that is in the direction of flow of the gas. A current collector layer 138 is provided along the other side of the cathode that is not in the flow path of the gas.

FIG. 7 depicts an alternative embodiment in which baffling 160 is used to force the gas fed to the electrode through the electrolyte and thereby introduce gas-driven convection. In FIG. 7, the electrochemical cell 150 includes a negative electrode 152 (metal anode) and a positive electrode 154 (multi-phase cathode) separated by a protection layer 156. The containment layer 162 is located on the same side as the baffling structure 160, which should be electronically conducting to provide for current collection. The cathode 154 contains liquid electrolyte 114, gas phase 116, and solid phase 118 (discharge product) as well as a conductive substrate material 120. In this embodiment, the optimization of the current density in the cell 150 can be achieved through the careful design of the gas flow pattern within the electrode. For example, the amount of gas-driven convection may depend on the position within the electrode and be different in the embodiments shown in FIGS. 6 and 7.

Figure 8:
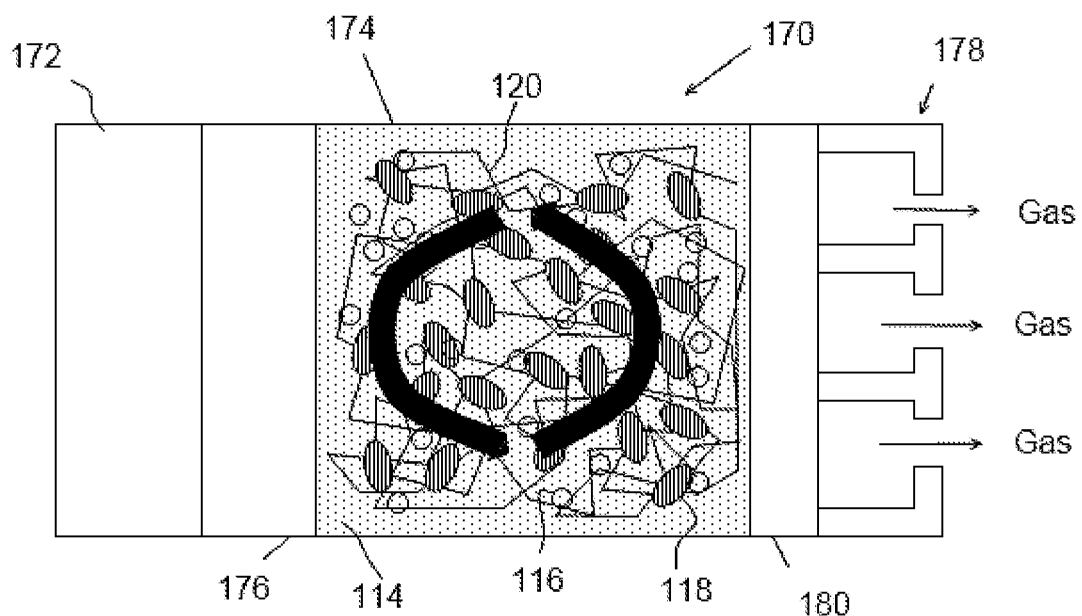
FIG. 8 is a schematic of a Li/air electrode that is undergoing charge and evolving oxygen gas in which convection is produced by bubbling within the electrolyte.

FIG. 8 depicts an embodiment in which charge is occurring. The electrochemical cell 170 of FIG. 8 includes a negative electrode 172 (metal anode) and a positive electrode 174 (multi-phase cathode) separated by a protection layer 176. As in FIG. 5, the cathode 104 contains liquid electrolyte 114, gas phase 116, and solid phase 118 (discharge product) as well as a conductive substrate material 120, such as carbon fibers. The cell 170 of FIG. 8 includes an electrolyte-containment layer 180 through which gas is allowed to escape the cell, and a flow field structure 178 that is electronically conductive to provide for current collection and which guides gas away from the cell. As depicted in FIG. 8, during charge, oxygen gas is produced in the cathode 174 which, with proper electrode engineering, can induce electrolyte convection that significantly increases the limiting current. This is helpful to increase the rate at which a Metal/air battery can be charged. It should be noted that whenever a Metal/Air cell is charged and oxygen is evolved that gas bubbling may occur if the transport of oxygen away from the reaction sites is not carried out at a three-phase boundary or if the generation rate of oxygen is too high for liquid-phase transport alone to remove it from flooded reaction sites. In the present disclosure the pore structure and electrode design are specifically designed to create bubbling that increases the limiting current during charge.

Embodiments of the present disclosure are envisioned in which the specific design of the electrodes (including the use of graded porosity structures), the flow fields, the gas-diffusion layer (if any), and additional layers that may influence electrolyte wetting and electrolyte transport are chosen so as to provide the desired amount of electrolyte convection and thereby the desired increase in the limiting current, for both charge and discharge.

The present disclosure makes use of the gas flowing into a Metal/air electrochemical cell to increase the limiting current by using the gas to mix the electrolyte. The limiting current is defined as the maximum current that can be achieved before the concentration of one of the reactants at the electrode surface is driven to zero, such that the current cannot be increased any more. Using gas to mix the electrolyte increases the limiting current because convection acts to stir regions of low concentrations with regions of high currents. Introducing convection to an electrochemical cell can increase the limiting current by more than a factor of 10. See J. Newman and K. E. Thomas-Alyea, *Electrochemical Systems*. 2004, Hoboken, N.J.: Wiley-Interscience. The introduction of convection is beneficial for the nonaqueous Metal/air cells in which the thickness of the layers containing liquid electrolyte is significantly limited by poor mass-transport properties, particularly the transference number and diffusion coefficient, in addition to the limited solubility of the salt. The higher flow rates of input gas that are required for higher powers will also provide a larger increase in the limiting current in the present disclosure. Further, during charge the limiting current may also be increased by the use of the oxygen that is produced during charging, for example through bubbling. The design of flow fields, gas-diffusion layers, and electrode structures that may include a graded porosity is used to practically achieve an increase in the limiting current. A layer to prevent electrolyte that may become entrained in the gas flow from exiting in the cell may be required, and may be practically achieved using a thin, porous medium with a wettability that prevents electrolyte passage. Alternatively, a distinct separation unit that operates on all the oxygen produced during charge may be used to remove entrained electrolyte, such that the separation layers may not be required on each cell.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A metal/air battery, comprising:
   a negative electrode;
   a positive electrode;
   a protection layer located between the negative electrode and the positive electrode;
   a liquid phase electrolyte within the positive electrode, wherein the positive electrode is arranged to induce convection of the electrolyte by movement of a gas phase of oxygen within the positive electrode;
   a containment layer configured to pass a gas phase into the positive electrode, the containment layer aligned with a flow path of the gas phase through the positive electrode; and
   a current collector for the positive electrode, wherein the current collector is not aligned with the flow path.

2. The metal/air battery of claim 1, further comprising:
   a gas phase baffling, the gas phase baffling configured to generate a directed flow of gas phase into the positive electrode whereby a convection current is generated in the positive electrode.

3. A method of forming a metal/air battery comprising:
   determining a limiting current for the metal/air battery;
   determining an electrolyte convection amount based upon the determined limiting current;
   providing a negative electrode;
   providing a positive electrode arranged to induce the determined electrolyte convection by movement of a gas phase of oxygen within the positive electrode;
   providing a protection layer located between the negative electrode and the positive electrode; and
   providing a liquid phase electrolyte within the positive electrode.

4. The method of claim 3, wherein providing a positive electrode arranged to induce the determined electrolyte convection comprises:
   providing a pore structure which induces electrolyte convection within the positive electrode during charging of the metal/air battery.

5. The method of claim 3, wherein providing a positive electrode arranged to induce the determined electrolyte convection comprises:
   arranging a containment layer configured to pass a gas phase into the positive electrode on a first side of the positive electrode; and
   arranging a current collector on a second side of the positive electrode, the second side adjacent to the first side.

6. The method of claim 3, wherein providing a positive electrode arranged to induce the determined electrolyte convection comprises:
   providing a containment layer configured to pass the gas phase into the positive electrode to establish a flow path of the gas phase through the positive electrode; and
   providing a current collector for the positive electrode, wherein the current collector is not aligned with the flow path.

7. The method of claim 3, wherein providing a positive electrode arranged to induce the determined electrolyte convection comprises:
   providing a baffle structure configured to pass the gas phase into the positive electrode to establish a flow path of the gas phase through the positive electrode.

\* \* \* \* \*